United States Patent [19]
Vickers, Jr. et al.

[11] Patent Number: 6,133,347
[45] Date of Patent: Oct. 17, 2000

[54] OLIGOMERIC DISPERSANT

[75] Inventors: Thomas M. Vickers, Jr., Concord Township; Rainer Packe-Wirth; Michael Porsch, both of Cleveland Heights; Samy M. Shendy, Cuyahoga Falls; Lynn E. Brower, Solon; John Pickett, Bedford; Runhai Lu, Stow; Frank Danko, Macedonia, all of Ohio

[73] Assignee: MBT Holding AG, Zurich, Switzerland

[21] Appl. No.: 09/350,394

[22] Filed: Jul. 9, 1999

[51] Int. Cl.⁷ .............................. C08K 3/00; C04B 24/32
[52] U.S. Cl. ........................ 524/8; 524/2; 524/4; 524/5
[58] Field of Search ................................ 524/2, 4, 5, 8

[56] References Cited

U.S. PATENT DOCUMENTS

| | | | |
|---|---|---|---|
| 3,884,871 | 5/1975 | Herman et al. | 524/816 |
| 4,508,572 | 4/1985 | Sakuta et al. | 524/5 |
| 4,587,279 | 5/1986 | Salyer et al. | 524/8 |
| 4,808,641 | 2/1989 | Yagi et al. | 524/8 |
| 4,814,014 | 3/1989 | Arfaei | 524/5 |
| 4,878,948 | 11/1989 | Shah | 524/4 |
| 4,891,072 | 1/1990 | Cooper | 524/5 |
| 4,946,904 | 8/1990 | Akimoto et al. | 524/5 |
| 5,041,477 | 8/1991 | Hays | 524/88 |
| 5,162,402 | 11/1992 | Ogawa et al. | 524/5 |
| 5,294,651 | 3/1994 | Stephens | 524/5 |
| 5,320,673 | 6/1994 | Carpenter | 106/404 |
| 5,358,566 | 10/1994 | Tanaka et al. | 524/5 |
| 5,362,324 | 11/1994 | Cerulli et al. | 524/2 |
| 5,614,017 | 3/1997 | Shawl | 524/5 |
| 5,624,980 | 4/1997 | Kobori | 524/8 |
| 5,665,158 | 9/1997 | Darwin et al. | 524/2 |
| 5,719,204 | 2/1998 | Beach et al. | 523/161 |
| 5,725,654 | 3/1998 | Shawl et al. | 524/5 |
| 5,753,744 | 5/1998 | Darwin et al. | 524/5 |
| 5,849,219 | 12/1998 | De Laat et al. | 526/332 |
| 5,880,182 | 3/1999 | Minomiya et al. | 524/5 |
| 5,919,881 | 7/1999 | Kinoshita et al. | 524/5 |

FOREIGN PATENT DOCUMENTS

| | | |
|---|---|---|
| 51793/93 | 5/1994 | Australia . |
| 612702 A1 | 8/1994 | European Pat. Off. . |
| 725044 A1 | 8/1996 | European Pat. Off. . |
| 849338 A1 | 6/1998 | European Pat. Off. . |
| 862 603 | 1/2000 | European Pat. Off. . |
| 19750245 A1 | of 0000 | Germany . |
| 19750246 A1 | of 0000 | Germany . |
| WO98/23553 | 6/1998 | WIPO . |
| WO98/51637 | 11/1998 | WIPO . |

OTHER PUBLICATIONS

Colfen et al., "Crystal Design of Calcium Carbonate Microparticles Using Double–Hydrophilic Block Copolymers," Langmuir, pp. 582–589, (1998).
Derwent WPI Publication, Acc. No. 87–308793/198744. English language abstract for FR 2595347A.

Primary Examiner—Peter A. Szekely
Attorney, Agent, or Firm—Renner, Kenner, Greive, Bobak, Taylor & Weber

[57] ABSTRACT

A cementitious formulation comprising a cement and an oligomeric dispersant is provided. The dispersant is a reaction product of two or three moieties. The first moiety (A) is a nonpolymeric, functional moiety that adsorbs onto a particle, and wherein one or more A moieties together contain at least two residues to provide attachment of the dispersant onto a particle to be dispersed. The second required moiety (C) is a linear or branched water soluble, nonionic polymer that provides the dispersing capability. A third moiety (B), if present, is a nonpolymeric moiety disposed between the first and second moiety, to connect the first and second moieties. A method is provided for dispersing a cementitious formulation comprising a cement in water, including providing in said cementitious formulation the above oligomeric dispersant. A combination of any cement dispersant with an oligomeric dispersant wherein at least one A moiety is blocked is also provided in a cementitious formulation and in a method of making such cementitious formulation.

52 Claims, No Drawings

OLIGOMERIC DISPERSANT

FIELD OF THE INVENTION

The present invention is directed to an oligomeric dispersant. More particularly, the present invention is directed to an oligomeric dispersant for cementitious particles. Specifically, the present invention is directed to a reaction product of a moiety that adsorbs onto a particle to be dispersed, a moiety that provides the dispersing capability, and an optional moiety that is disposed between the other moieties to provide connections between the other moieties.

BACKGROUND OF THE INVENTION

A cementitious mixture refers to pastes, mortars, and concrete compositions comprising a hydraulic cement binder. Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture that does not adversely affect the advantageous results obtained by the present invention.

Dispersants are substances that improve the flow characteristics of the cement slurry by breaking up cement agglomerates and freeing the water, thus giving slurries of lower viscosity and allowing desirable flow conditions to be obtained at lower pump pressures. V. S. Ramachandran, *Concrete Admixtures Handbook: Properties, Science, and Technology*, Noyes Publications (Second Edition, 1995).

Dispersants have been used in the construction industry to disperse cementitious mixtures. Dispersants such as sulfonated melamine formaldehyde condensate (SMF), sulfonated naphthalene formaldehyde condensate (BNS), and lignosulfonates are commonly used as dispersants. However, these compounds require more than the desired amount of material to achieve a desired level of concrete workability or water reduction. In addition, these materials do not achieve full range (Type A to Type F) water reducing capability, as defined in ASTM C494. For example, lignosulfonates achieve only a low to mid range (5–12%) water reduction.

Dispersants are a necessary component in high strength and high durability concretes. Due to the requirement for the use of low water amounts in high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like lignosulfonates, BNS and SMF. Improving efficiency reduces the amount of material required to achieve a desired level of concrete workability or water reduction. With respect to the presently used dispersants, lignosulfonates, BNS and SMF, it is also desirable to improve slump retention while maintaining normal setting characteristics. Providing a dispersant with full range (Type A to F) water reducing capability is also a desirable characteristic.

One improvement in the prior art was to use polycarboxylate dispersants. Polycarboxylate dispersants are structured with a polymeric backbone, such as a carbon chain backbone, with pendant moieties. The pendant moieties provide the dispersing capabilities of the molecule. For example, polyacrylic acid has carboxylic groups attached to the backbone. Also, side chain moieties such as polyoxyalkylenes can be attached to the carboxylic groups to provide further dispersing capabilities. These dispersants operate by surrounding a particle to be dispersed, and then repulsion forces between each polymer chain keeps the particles apart and more fluid.

It is therefore an object of the invention to provide oligomeric dispersants for dispersing cementitious particles, wherein the dispersant adsorbs onto the particle to be dispersed.

SUMMARY OF THE INVENTION

The present invention provides a cementitious formulation comprising a hydraulic cement and a dispersant comprising a reaction product of component A, optionally component B, and component C;

wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof.

The present invention further provides a method of dispersing a cementitious formulation of a hydraulic cement in water, comprising providing in said cementitious formulation a dispersant comprising a reaction product of component A, optionally component B, and component C;

wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof.

DETAILED DESCRIPTION OF THE INVENTION

The oligomeric cement dispersant of the present invention does not have a polymeric backbone with pendant groups like dispersants of the prior art. Rather, the oligomeric cement dispersant has a moiety that will adsorb onto the particle to be dispersed by means of one or more residues attached to an adsorbing moiety of absolute molecular weight. The adsorbing moiety acts as an "anchor" to hold the dispersant onto the particle to be dispersed.

One embodiment of the present invention is a composition of matter adapted for dispersing cementitious particles in water comprising a reaction product of component A, optionally component B, and component C.

Each component A is independently a nonpolymeric, functional moiety that adsorbs onto a particle, and contains at least one residue derived from a component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, derivatives of carbohydrates, salts of any of the preceding moieties, and mixtures thereof. Derivatives of carbohydrates include, but are not limited to, phosphate esters of sugars, borate esters of sugars, and sulfate esters of sugars.

The salt of moiety A is selected from the group consisting of lithium, sodium, potassium, calcium, magnesium, aluminum, iron, ammonia, amines, and mixtures thereof. The term amines is meant to include primary, secondary, and tertiary amines, including, but not limited to, substituted amines such as triethanolamine or morpholine.

Molecules satisfying the requirement of the A moiety include, but are not limited to, multihydroxy compounds, such as sugars, sugar acids, lactones of sugar acids, sugar alcohols, tris(hydroxymethyl) aminomethane, phosphate esters of sugars, borate esters of sugars, sulfate esters of sugars, alkyl phosphates, substituted alkyl phosphates, alkyl phosphonates, substituted alkyl phosphonates, alkyl phosphinates, substituted alkyl phosphinates, aryl boronic acids, esters of aryl boronic acids, aryl dioxaborolanes, triaryl boroxines, trialkoxyboroxines, alkyl trialkoxy silanes, alkyl triacyloxy silanes, alkyl triaryloxy silanes, hydroxy carboxylic acids, non-polymeric polycarboxylic acids, and mixtures thereof. The alkyl groups in the above molecules are generally $C_1$ to about $C_6$ groups, the aryl groups in the above molecules are generally about $C_6$ to about $C_{10}$ groups, and the acyl groups in the above molecules are generally $C_1$ to about $C_6$ groups. The substituted alkyls can be hydroxyalkyls or carboxyalkyls.

Illustrative examples of molecules used to construct the A moiety include, but are not limited to, 2-carboxyethyl phosphonic acid, sulfosuccinic acid, citric acid, 2-phosphono-1, 2,4-butane tricarboxylic acid, glucuronic acid, ethylenediaminetetraacetic acid, gluconic acid, cyclohexane hexacarboxylic acid, mellitic acid, saccharic acid, mucic acid, diethylenetriamine pentaacetic acid, glucoheptonic acid, glucoheptonic lactone, lactobionic acid, 3,3',4,4'-benzophenone tetracarboxylic acid, 2-(4'carboxyphenyl)-1,3,2-dioxaborolane, triphenyl boroxine, 4-carboxyphenyl boronic acid, 4-formylphenyl boronic acid, 2-(4'-formylphenyl)-1,3,2-dioxaborolane, amino propyl trimethoxysilane, aminopropyltriethoxysilane, 3-glycidoxypropyltrimethoxy silane, 3-glycidoxypropyltriethoxysilane, 3-(triethoxysilyl)propyl isocyanate, 3-(trimethoxysilyl)propyl isocyanate, glucooctanoic-γ-lactone, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl)iminodiacetic acid, 3-[[tris(hydroxymethyl)methyl] amino]-1-propanesulfonic acid, 2-[[tris(hydroxymethyl)methyl] amino]-1-ethanesulfonic acid, 3-[bis(2-hydroxyethyl) amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, glucosamine, galactosamine, mannosamine, tris (hydroxymethyl)aminomethane, γ-carboxyglutamic acid, glucamine, glucosaminic acid, β-carboxyaspartic acid, α-hydroxymethylaspartic acid, tricine, 1,2,3,4-cyclopentanetetracarboxylic acid, 6-phosphogluconic acid, sorbitol, mannose, mannitol, mannonic acid, mannuronic acid, galactose, galactitol, galactaric acid, galacturonic acid, fructose, sucrose, salts of any of the preceding moieties, and mixtures thereof.

Each A moiety has one or more functional groups. When the A moiety has one functional group, two or more A moieties are combined to provide for multiple functional groups in the oligomeric dispersant. When the A moiety has multiple functionalities, there is no requirement that more than one A moiety must be used. Examples of the residue include, but are not limited to, hydroxyl, carboxylate, sulfate, sulfonate, sulfinate, phosphate, phosphonate, phosphinates, borate, boronate, boroxine, dioxaborolane, amine, quaternary ammonium, and mixtures thereof. The functional groups attach to the cement particle to be dispersed by adsorbing onto the cement particle. The more functional groups that are present on the A moiety, the more strongly the A moiety can anchor to the cement particle.

Component B is an optional moiety, and if present, each B is independently a nonpolymeric moiety that is disposed between the A moiety and the C moiety, and is derived from a second component selected from the group consisting of $C_1$ to about $C_6$ linear saturated hydrocarbons, $C_1$ to about $C_6$ linear unsaturated hydrocarbons, $C_1$ to about $C_6$ branched saturated hydrocarbons, $C_1$ to about $C_6$ branched unsaturated hydrocarbons, about $C_6$ to about $C_{10}$ arylenes, nitrogen containing compounds, and mixtures thereof. Nitrogen containing compounds include, but are not limited to, any amine.

Illustrative examples of the B moiety include, but are not limited to, methylene, ethylene, n-propylene, n-butylene, n-pentylene, n-hexylene, isobutylene, neopentylene, propenylene, isobutenylene, diethylene triamine, triethylene tetramine, tetraethylene pentamine, or pentaethylene hexamine, phenylene, substituted arylenes such as

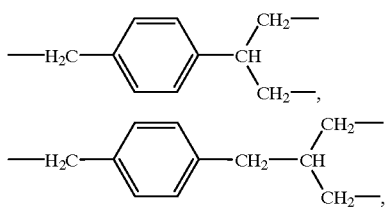

and mixtures thereof.

Each C component is at least one moiety that is a linear or branched water soluble, nonionic polymer substantially non-adsorbing to cement particles, and is preferably selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof.

The C moiety has a number average molecular weight from about 500 to about 100,000. Preferably, the C moiety has a number average molecular weight from about 1,000 to about 50,000. Most preferably, the C moiety has a number average molecular weight from about 1,000 to about 30,000.

The oligomeric dispersant of the present invention has number average molecular weight from about 650 to about 100,000. Preferably, the dispersant has a number average molecular weight from 1,150 to about 50,000. Most preferably, the dispersant has a number average molecular weight from about 1,150 to about 30,000.

The dispersant according to the present invention can have a structure represented by the following general formulas:

(i) $A_x$—C;
(ii) $A_x$—C—$A_x$;
(iii) C—$A_x$—C;
(iv) $(A_x)_y$—B—$(C)_z$;
(v) $(C)_z$—B—$A_x$—B—$(C)_z$;
(vi) $(A_x)_y$—B—C—B—$(A_x)_y$;

and mixtures thereof, wherein x is preferably an integer from 1 to 3 and represents the number of A moieties in a linear chain, y is preferably an integer from 1 to 3 and represents the number of independent A moieties, and z is preferably an integer from 1 to 3 and represents the number of independent C moieties.

For further clarification, $A_x$ is preferably at least one of A-, A-A-, or A-A-A-;

B-$(C)_z$ is preferably at least one of B—C

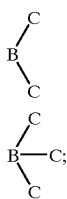

and
$(A_x)_y$-B is preferably at least one of $A_x$—B

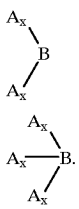

In another embodiment, the above composition of matter is incorporated into a cementitious formulation with a hydraulic cement. The oligomeric dispersant can be added as an admixture alone or in combination with other admixtures in the field, or can be added to the cementitious formulation prior to delivery to the field.

The hydraulic cement comprising the cementitious formulation for which the dispersants are effective is selected from the group consisting of portland cement, masonry cement, alumina cement, refractory cement, magnesia cement, calcium sulfoaluminate cement, and mixtures thereof.

Aggregate can be included in the cementitious formulation to provide for mortars which include fine aggregate, and concretes which also include coarse aggregate. The fine aggregate are materials that pass through a Number 4 sieve (ASTM C125 and ASTM C33), such as silica sand. The coarse aggregate are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

Additionally, cement admixtures may be included in the cementitious formulation. Cement additives that can be added include, but are not limited to, set accelerators, set retarders, air entraining agents, air detraining agents, foaming agents, defoaming agents, corrosion inhibitors, shrinkage reducing agents, other known dispersing agents, pozzolans, pigments, and mixtures thereof.

The cementitious formulation may further comprise water. The water can be present in an amount from about 20% to about 100% based on the dry weight of the cement.

The dispersant of the present invention is generally present in the cementitious formulation in an amount from about 0.005 to about 2% based on the dry weight of the cement. Preferably, the dispersant is present in an amount from about 0.01% to about 1%.

An additive selected from the group consisting of soil, calcined clay, and mixtures thereof can be included in the cementitious formulation. The soil can be any soil including, but not limited to, fine sands, silty soils, and clay. The additive can replace up to about 25% of the cement. Preferably, the additive replaces up to 20% of the cement.

In another embodiment of the present invention, there is provided a method of dispersing a cementitious formulation comprising a hydraulic cement in water, including providing in said cementitious formulation the above described oligomeric cement dispersant.

In another embodiment of the invention, an oligomeric dispersant wherein at least one A moiety in the oligomeric dispersant is blocked is used in combination with a second dispersant which is selected from another oligomeric dispersant of the present invention or any other suitable cementitious dispersant. By "blocked" it is meant that the residue on the A moiety does not interact with the cement until the residue is liberated. The residue is liberated/deblocked over time by hydrolyzing in the alkaline environment of the cementitious system. This provides for latent dispersant properties.

The effect of liberating over time results in a delay of dispersing performance that leads to extended slump retention performance. The residues on the A moiety that are blocked include, but are not limited to, trialkoxy silanes, triacyloxy silanes, and triaryloxy silanes. A preferred blocked residue is trialkoxy silanes.

The blocked oligomeric dispersant can be present in a cementitious formulation in an amount from about 0.005 to about 2% based on the dry weight of the cement. Preferably, the blocked oligomeric dispersant is present in an amount from about 0.01% to about 1%. Preferably, the ratio of the blocked oligomeric dispersant to the other dispersant is from about 1:10 to about 5:1. More preferably, the ratio is about 1:5 to about 3:1.

By any cementitious dispersant it is meant to include all chemicals that function as a dispersant, water reducing agent, or plasticizer for cement. Illustrative examples include, but are not limited to, beta naphthalene sulfonates, lignosulfonates, polyacrylic acids, polymethacrylic acids, polycarboxylates, and polyaspartates.

SPECIFIC EMBODIMENTS OF THE INVENTION

Oligomeric dispersants according to the present invention were synthesized and tested as described below. The molecular weights used herein are number average molecular weights. The following tests were used: Slump (ASTM C143), Air content (ASTM C231), and Set time (ASTM C403). Aggregates met the specifications of ASTM C33.

SYNTHESIS EXAMPLE 1

1.1 g (0.003 mole) of 1,2,3,4,5,6-cyclohexane hexacarboxylic acid was suspended in 5.5 g of deionized water. 6.52 g of methoxy polyoxyalkylene amine (JEFFAMINE® M-2070 (XTJ-508) from Huntsman Corporation with a 2000 molecular weight) was slowly added to the mixture to achieve a homogeneous solution. 0.001 g of 4-methoxy phenol was added while stirring the solution. The solution was heated to 180° C. under nitrogen gas stream for 60 minutes. The reaction mixture was cooled to room temperature. The reaction product was dissolved in aqueous sodium hydroxide solution to obtain a 39.1% solids solution at a pH 8.4.

SYNTHESIS EXAMPLE 2

0.57 g (3.7 mmole) of 2-carboxyethylphosphonic acid was dissolved in 6 g of water and 11.11 g (3.7 mmole) of methoxypolyoxyalkylene amine (M3000 from BASF with a 3000 molecular weight) was added. The mixture was heated under nitrogen at 160° C. for 4.5 hours.

SYNTHESIS EXAMPLE 3

2.44 g of gluconic acid solution (48.2% aqueous solution) was combined with 2 g of deionized water in a 50 ml round bottom flask. 6.12 g of methoxy polyoxyalkylene amine (JEFFAMINE® M-1000 (XTJ-506) from Huntsman Corporation with a 1000 molecular weight) was added in portions while stirring. 0.002 g of 4-methoxy phenol was added. The solution was heated to 160° C. under nitrogen stream for 90 minutes. The mixture was cooled to room temperature. The reaction mixture was dissolved in water to obtain a 40% solids solution at neutral pH.

SYNTHESIS EXAMPLE 4

A solution of 4.03 g (16.3 mmol) of 3-(triethoxysilyl)propyl isocyanate in 20 ml of tetrahydrofuran (THF) was added to 0.84 g (8.15 mmol) of diethylenetriamine in a flask cooled in an ice bath. The mixture was stirred at 0° C. for 1 hour, then at ambient temperature for 4 hours. The solvent was evaporated and the viscous, colorless product was dried in a vacuum.

0.848 g (1.42 mmol) of the product was dissolved in 30 ml THF. 2.92 g (1.42 mmol) methoxy polyoxyethylene glycol-chloroformate, prepared from methoxy polyoxyethylene glycol (MPEG 2000 from Harcros Organics, Inc. with a 2000 molecular weight) and triphosgene, and 0.2 ml triethylamine were added to the solution. The mixture was stirred at ambient temperature for 3 hours. The material was filtered and the solvent was evaporated. The resulting pale yellow solid was vacuum dried.

SYNTHESIS EXAMPLE 5

131.6 g (0.048 equivalents of amine) of methoxy polyoxyalkylene amine (JEFFAMINE® XTJ-234 from Huntsman Corporation with a 3000 molecular weight) was combined with 10 g (0.048 mole) of α-D-glucoheptonic-γ-lactone in an oven dried 250 ml round bottom flask. The stirred mixture was heated to 110° C. under a dry nitrogen gas purge for 5.5 hours.

EXAMPLE 1

Dispersants of the present invention were prepared and compared to dispersants of the prior art. For the A moiety, 1,2,3,4,5,6-cyclohexane hexacarboxylic acid was used in all samples for this example. For the C moiety, methoxy polyoxyalkylene amines were used. The following materials were used for the samples: Sample A, JEFFAMINE® M-1000 (XTJ-506) from Huntsman Corporation with a 1000 molecular weight; Sample B, JEFFAMINE® M-2070 (XTJ-508) from Huntsman Corporation with a 2000 molecular weight; Sample C, JEFFAMINE® XTJ-234 from Huntsman Corporation with a 3000 molecular weight; and sample D methoxy polyoxyethylene amine from Shearwater Polymers, Inc. with a 5000 molecular weight. Finally, a beta-naphthalene sulfonate formaldehyde condensate (BNS) was tested as a comparison. The specific level of dispersant used is listed below in Table 1.

The water to cement ratio used was 0.35. The dispersant and water were hand mixed into 500 g of Portland Type I cement and mixed to a uniform consistency. The paste was then mechanically mixed at 700 rpm for one minute. The results of the testing are shown below in Table 1.

TABLE 1

| Sample | Dose (% of cement) | Paste Mass Flow Rate (g/sec) | Paste Spread Diameter (cm) |
|---|---|---|---|
| A | 0.2 | 109 | 12.6 |
| B | 0.2 | 66 | 11.0 |
| c | 0.2 | 59 | 10.7 |
| D | 0.2 | 53 | 10.6 |
| BNS | 0.2 | 17 | 0 |

The molecular weight of the "C" moiety of the oligomeric dispersants of the present invention did not influence the paste mass flow rate and the paste spread diameter. Compared to the BNS dispersants of the prior art, performance was improved.

EXAMPLE 2

The relationship between the number of attached C moieties on the A moiety and performance was tested. For the A moiety, 1,2,3,4,5,6-cyclohexane hexacarboxylic acid was used in all samples for this example. For the C moiety, a methoxy polyoxyalkylene amine, JEFFAMINE® M-1000 (XTJ-506) from Huntsman Corporation with a 1000 molecular weight was used. The molar ratio of the A moiety to the C moiety for the samples were: Sample A 1:1 (corresponding to general formula i, $A_x$-C; same sample from Example 1); Sample E 1:1.25, and Sample F 1:1.75 (E and F correspond to general formula iii, C-$A_x$-C). The prior art comparative example was the same as in Example 1. The samples were prepared as described above in Example 1. The results of the testing are shown below in Table 2.

TABLE 2

| Sample | Dose (% of cement) | Paste Mass Flow Rate (g/sec) | Paste Spread Diameter (cm) |
|---|---|---|---|
| A | 0.2 | 109 | 12.6 |
| E | 0.2 | 61 | 10.8 |
| F | 0.2 | 13 | 0 |
| BNS | 0.2 | 17 | 0 |

As shown in Table 2, as more C moieties are attached to the A moiety, the effectiveness as a dispersant decreases. As more C moieties are added, there are fewer functional groups with which to adsorb onto the particle to be dispersed. Anchor group binding strength is preferably balanced with the C moiety size and number for optimum performance.

EXAMPLE 3

The relationship of A moiety structure on dispersability was tested at a higher water to cement ratio. Samples A, B, C, D, and F were prepared as described above. Sample G was prepared with 2-carboxyethylphosphonate as the A moiety with a methoxy polyoxyalkylene amine, JEFFAMINE® M-1000 (XTJ-506) from Huntsman Corporation with a 1000 molecular weight, as the C moiety. Also, the samples were compared to a plain paste without any dispersant, and a calcium lignosulfonate dispersant containing sample was tested as a comparison. The water to cement ratio in this example was 0.42. The mix procedure was the same as in Example 1, except that each paste, except sample G, was stored for five minutes and then mechanically re-mixed for one minute at 700 rpm. Sample G was mixed as in Example 1. The test results are shown in Table 3 below.

TABLE 3

| Sample | Dose (% of cement | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 60 | 29 | 9.7 | 7.8 |
| A | 0.1 | 128 | 101 | 13.0 | |
| F | 0.1 | 116 | 73 | 12.1 | 11.4 |
| B | 0.1 | 133 | 90 | 13.0 | 12.3 |
| C | 0.1 | 121 | 91 | 12.6 | 11.2 |
| D | 0.1 | 122 | 79 | 12.6 | 11.2 |
| G | 0.2 | 75 | 51 | 10.9 | 10.4 |
| Ca Ligno-sulfonate | 0.19 | 86 | 44 | 11.0 | 9.6 |
| BNS | 0.1 | 80 | 33 | 10.5 | 8.6 |

The results in Table 3 show that the plain sample and the lignosulfonate sample lose about half of the flow in about 20 minutes. The BNS loses more than half of the initial flow. The dispersants of the present invention, however, lose less than half of the initial flow in the same time period. The dispersants of the present invention perform better than lignosulfonates at a lower dosage, perform better than BNS at the same dosage.

EXAMPLE 4

The relationship of dispersant structure, as influenced by C moiety molecular weight, to initial set time of a cement paste was tested. The dispersants tested were those from the above examples. The water to cement ratio was 0.35. All dispersants were added at 0.2% based on the weight of cement. The mixing was the same as described above in Example 1. The initial set time was tested using a Form+Test automated set time apparatus using 300 g of each prepared paste. The results are listed in Table 4 below.

TABLE 4

| Sample | MW of C Moiety | Initial Set Time (hours) |
|---|---|---|
| A | 1000 | 12.1 |
| B | 2000 | 10.2 |
| C | 3000 | 7.5 |
| D | 5000 | 6.1 |
| Ca Lignosulfonate | N/A | 6.5 |
| BNS | N/A | 4.9 |

N/A = not applicable

Table 4 shows that as the molecular weight of the C moiety increases, the initial set time is reduced.

EXAMPLE 4A

The relationship of the number of attached C moieties on the A moiety in the dispersant structure to initial set time of a cement paste was tested. The dispersants are those from the above examples. The water to cement ratio was 0.35. All dispersants were added at 0.2% based on the weight of cement. The mixing was the same as above Example 1. The initial set time was tested using a Form+Test automated set time apparatus using 300 g of each prepared paste. The results are listed in Table 4A below.

TABLE 4A

| Sample | Molar Ratio A moiety to C moiety | Initial Set Time (hours) |
|---|---|---|
| A | 1:1 | 12.1 |
| E | 1:1.25 | 10.2 |
| F | 1:1.75 | 7.0 |
| Ca Lignosulfonate | N/A | 6.5 |
| BNS | N/A | 4.9 |

N/A = not applicable

The results in Table 4A show that as more C moieties are attached to the A moiety, the initial set time decreases.

EXAMPLE 5

The relationship of the A moiety functionality to fluidity of a cement paste was tested. The water to cement ratio was 0.35. The preparation of the paste samples was the same as in Example 3 above. The C moieties for the samples were methoxy polyoxyalkylene amine, JEFFAMINE® M-1000 (XTJ-506) from Huntsman Corporation with a 1000 molecular weight, for Samples 2–6, and methoxy polyoxyethylene glycol from Union Carbide Corporation with a 2000 molecular weight, for Sample 1.

TABLE 5

| Sample | Starting A moiety | A Moiety Functionality after attachment to the C moiety | C Moiety MW | Number of A Moieties | Dose (% of cement) | Paste Mass Flow Rate (g/sec) | Paste Spread Diameter (cm) |
|---|---|---|---|---|---|---|---|
| 1 | succinic anhydride | 1-COOH | 2000 | 1 | 0.2 | 0 | 0 |
| 2 | 2-carboxyethyl phosphonic acid | 1-PO$_3$H$_2$ | 1000 | 1 | 0.3 | 7.9 | 0 |
| 3 | citric acid | 2-COOH 1-OH | 1000 | 1 | 0.3 | 14 | 0 |
| 4 | 1,2,3,4,5,6-cyclohexane hexacarboxylic acid | 5-COOH | 1000 | 1 | 0.2 | 109 | 12.6 |
| 5 | mellitic acid | 5-COOH | 1000 | 1 | 0.2 | 72 | 10.0 |
| 6 | gluconic acid | 5-OH | 1000 | 1 | 0.2 | 62 | 12.7 |

The total number of active functional groups on the A moiety(s) influences the performance of the dispersant. As the total number of active functional groups increases, the dispersing performance increases.

EXAMPLE 6

The A moiety was varied to compare performance against prior art dispersants and a plain cement paste reference. The A moieties tested are listed below in Table 6. The C moiety was a methoxy polyoxyalkylene amine, JEFFAMINE® XTJ-234 from Huntsman Corporation with a 3000 molecular weight. The reference dispersant was a polymeric carboxylate backbone with polyether group side chains. The water to cement ratio was 0.35. The mix procedure was the same as in Example 1. The results are listed below in Table 6.

TABLE 6

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 0 | 0 | 0 | 0 |
| Gluconate as "A" | 0.2 | 66 | 53 | 14 | 14 |
| Gluco-heptonate as "A" | 0.15 | 95 | 85 | 19.5 | 19.5 |
| Gluco-heptonate as "A" | 0.1 | 71 | 58 | 14.7 | 14.5 |
| Ca Ligno-sulfonate | 0.3 | 5.6 | 0 | 0 | 0 |
| BNS | 0.3 | 81 | 25 | 10.7 | 7.3 |
| Ref. Poly-carboxy-late | 0.1 | 110 | 73 | 16.7 | 16.0 |

The results in Table 6 show improved dispersant performance by the oligomeric dispersants over the calcium lignosulfonate and BNS dispersants, and comparable performance to the polymeric carboxylate/polyether dispersant. Also, glucoheptonate (with 6 hydroxyl groups) as the A moiety performs better than gluconate (with 5 hydroxyl groups) as the A moiety.

EXAMPLE 7

Several dispersants according to the present invention were compared to a plain sample and a calcium lignosulfonate dispersant in a concrete formulation. The A moiety was either gluconate or glucoheptonate. The C moiety was a methoxy polyoxyalkylene amine, being either JEFFAMINE® M-2070 (XTJ-508) from Huntsman Corporation with a 2000 molecular weight or JEFFAMINE® XTJ-234 from Huntsman Corporation with a 3000 molecular weight.

The plain mix consisted of 12.1 kg of Portland cement, 37.8 kg of crushed stone, 24.9 kg of sand, and 6.65 kg of water to provide a water to cement ratio of 0.55. The amount of dispersant is listed below in Table 7. The mixes were adjusted with sand and stone to compensate for the reduced water requirement with a dispersant to maintain a constant concrete volume for all mixes. Dispersed mixes contained less water, as indicated by the % water reduction in Table 7.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. Note, mixes 3–6 contained a defoamer, which was a non-silicone proprietary mixture sold as SURFYNOL® DF-75 from Air Products, added at 0.75% by weight of the dispersant.

increased to about 19 rpm. Note, all mixes, except the BNS mix, contained a defoamer, which was a non-silicone proprietary mixture sold as SURFYNOL® DF-75 from Air Products, added at 0.75% by weight of the dispersant.

TABLE 7

| Sample | Dose (%) | Water Reduction (%) | Slump (in) | % Air | Initial Set Time | Compressive Strength (Mpa) | | |
|---|---|---|---|---|---|---|---|---|
| | | | | | | 1 day | 11 days | 28 days |
| Plain | — | — | 7.5 | 0.8 | 5:08 | 1360 | 4200 | 4980 |
| Calcium Lignosulfonate | 0.2 | 8 | 7.75 | 1.4 | 6:51 | 1770 | 5550 | 6420 |
| Gluconate/ XTJ-508 | 0.2 | 10.4 | 7.75 | 4.4 | 7:01 | 1770 | 4970 | 5880 |
| Gluconate/ XTJ-234 | 0.2 | 10 | 7.5 | 2.1 | 6:17 | 1930 | 5030 | 6300 |
| Glucoheptonate/ XTJ-234 | 0.2 | 15.1 | 8 | 1.5 | 6:17 | 2600 | 6510 | 7410 |
| Glucoheptonate/ XTJ-508 | 0.2 | 16.8 | 8.25 | 1.6 | 6:48 | 2490 | 6800 | 7750 |

Oligomeric dispersant produces greater water reduction than lignosulfonate dispersants at the same dosage. Better performing oligomeric dispersants were less retarding with greater water reduction and produced higher concrete compressive strength. Glucoheptonate anchor performs better than the gluconate anchor.

EXAMPLE 8

A concrete batch was prepared to compare dispersants of the present invention to BNS and polycarboxylate dispersants. The dispersant of the present invention used a glucoheptonate molecule as the A moiety and as the C moiety, a methoxy polyoxyalkylene amine, namely JEFFAMINE® M-2070 (XTJ-508) from Huntsman Corporation with a 2000 molecular weight (2 K), or JEFFAMINE® XTJ-234 from Huntsman Corporation with a 3000 molecular weight (3 K). The reference dispersant was a polymeric carboxylate backbone with polyether group side chains.

The mix consisted of 20.5 kg of Portland cement, 61 kg of crushed stone, 46 kg of sand, and 9.03 kg of water to provide a water to cement ratio of 0.46. The amount of dispersant is listed below in Table 8.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. The slump and air were measured initially. The mixer rate was reduced to about 4 rpm until one minute before each sample time. At one minute before taking the sample, the mixer rate was increased to about 19 rpm. Note, all mixes, except the BNS mix, contained a defoamer, which was a non-silicone proprietary mixture sold as SURFYNOL® DF-75 from Air Products, added at 0.75% by weight of the dispersant.

TABLE 8

| Sample | Dose % cement | % Air | | | Slump (mm) | | | Set Time (hours) |
|---|---|---|---|---|---|---|---|---|
| | | Initial | 45 min | 65 min | Initial | 45 min | 65 min | |
| Gluco.3k | 0.2 | 1.4 | 1.9 | 2 | 230 | 170 | 115 | 6 |
| BNS | 0.4 | 2.2 | 1.7 | | 215 | 70 | | 5 |
| Polycarboxylate | 0.14 | 1.7 | 1.8 | 2.1 | 205 | 120 | 120 | 5 |
| Polycarboxylate | 0.16 | 1.1 | 2 | 2.1 | 230 | 180 | 165 | 5.75 |

The results in Table 8 show that the dispersant of the present invention has improved slump retention as compared to BNS, and performs comparably to the reference polycarboxylates to provide improved slump retention properties.

EXAMPLE 9

The alkoxysilane dispersant that was prepared as in Synthesis Example 4 was tested in combination with a polycarboxylate dispersant in a cementitious mixture. The polycarboxylate dispersant was a polymeric carboxylate backbone with polyether group side chains. The cementitious formulation was prepared as described in Example 8. Both samples contained a defoamer, which was a non-silicone proprietary mixture sold as SURFYNOL® DF-75 from Air Products, added at 0.75% by weight of the dispersant. The results are reported in Table 9.

TABLE 9

| Sample | Dose % cement | % Air Initial | % Air 65 min | % Air 125 min | Slump (mm) Initial | Slump (mm) 65 min | Slump (mm) 125 min | Set Time hours | Compressive Strength (psi) 1 day | Compressive Strength (psi) 7-day |
|---|---|---|---|---|---|---|---|---|---|---|
| Polycarboxylate | 0.16 | 2.4 | 3.4 | 2.5 | 230 | 205 | 110 | 6.1 | 2660 | 5400 |
| Polycarboxylate/ Alkoxysilane | 0.12/ 0.10 | 1.9 | 2.4 | 2.7 | 230 | 220 | 175 | 6.4 | 2690 | 5830 |

The alkoxysilane dispersant improved concrete slump retention without increasing set time and decreasing early age concrete compressive strength.

EXAMPLE 10

The alkoxysilane dispersant that was prepared as in Synthesis Example 4 was tested in combination with another oligomeric dispersant in a cementitious paste. The cementitious paste was prepared as described in Example 1 with a water to cement ratio of 0.35. The other oligomeric dispersant had glucoheptonate as the A moiety and JEFFAMINE® M-2070 (XTJ-508) from Huntsman Corporation with a 2000 molecular weight as the C moiety (Other). The alkoxysilane "blocked" or latent dispersant was added at the dosages described below in Table 10.

TABLE 10

| Dispersant | Dose % cement | Paste Mass Flow Rate (g/sec) Initial | 60 min | 120 min | 180 min | Paste Spread Diameter (cm) Initial | 60 min | 120 min | 180 min |
|---|---|---|---|---|---|---|---|---|---|
| Other | 0.1 | 44 | 35 | 24 | 10 | 12.2 | 12.0 | 9.9 | 8.6 |
| Other/ Alkoxysilane | 0.1 0.1 | 60 | 69 | 66 | 54 | 15.0 | 17.7 | 16.9 | 16.0 |
| Other/ Alkoxysilane | 0.1 0.2 | 72 | 84 | 84 | 79 | 17.4 | 21.5 | 21.6 | 22.3 |

The results in Table 10 show that the alkoxysilane dispersant significantly increases the duration of the dispersed state when used in combination with another oligomeric dispersant. The effect of the alkoxysilane dispersant is related to dose, and it increases with increasing dose.

The present invention therefore is demonstrated to provide an oligomeric dispersant for dispersing cementitious particles, wherein the dispersant adsorbs onto the particle to be dispersed to provide a material that is several times more efficient than traditional dispersants, such as beta naphthalene sulfonates, sulfonated melamine formaldehyde condensates, or calcium lignosulfonates, and to provide a full range (Type A to Type F) water reducing capability.

The present invention also includes the novel oligomeric dispersants which includes a reaction product of component A, optionally component B, and component C;
    wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;
    wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and
    wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof;
as more fully described above.

It should be appreciated that the present invention is not limited to the specific embodiments described above, but includes variations, modifications and equivalent embodiments defined by the following claims.

What is claimed is:

1. A cementitious formulation comprising a cement and a dispersant comprising a reaction product of component A, optionally component B, and component C;
    wherein each component A is independently a nonpolymeric, functional moiety that adsorbs onto a cementitious particle, and contains more than one residue derived from a first component selected from the group consisting of sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly (oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof.

2. The cementitious formulation of claim 1, wherein the cement is selected from the group consisting of portland cement, masonry cement, alumina cement, refractory cement, magnesia cement, calcium sulfoaluminate cement, and mixtures thereof.

3. The cementitious formulation of claim 1 further comprising aggregate.

4. The cementitious formulation of claim 1 further comprising a cement admixture selected from the group consisting of set accelerators, set retarders, air entraining agents, air detraining agents, foaming agents, defoaming agents, corrosion inhibitors, shrinkage reducing agents, pozzolans, cementitious dispersants, pigments, and mixtures thereof.

5. The cementitious formulation of claim 1 further comprising water in an amount from about 20% to about 100% based on the dry weight of the cement.

6. The cementitious formulation of claim 1, wherein the cement dispersant is present in an amount from about 0.005 to about 2% based on the dry weight of the cement.

7. The cementitious formulation of claim 1, wherein the cement dispersant is present in an amount from about 0.01 to 1% based on the dry weight of the cement.

8. The cementitious formulation of claim 1, wherein the dispersant has a structure selected from the group consisting of

| | | |
|---|---|---|
| (i) $A_x$-C; | (ii) $A_x$-C-$A_x$; | (iii) C-$A_x$-C; |
| (iv) $(A_x)_y$-B-$(C)_z$; | (v) $(C)_z$-B-$A_x$-B-$(C)_z$; | (vi) $(A_x)_y$-B-C-B-$(A_x)_y$; | and mixtures thereof, wherein x is an integer from 1 to 3 and represents the number of A moieties in a linear chain, y is an integer from 1 to 3 and represents the number of independent chains of A moieties, and z is an integer from 1 to 3 and represents the number of independent C moieties.

9. The cementitious formulation of claim 1, wherein the A moiety is selected from the group consisting of sugars, sugar acids, lactones of sugar acids, sugar alcohols, tris (hydroxymethyl) aminomethane, phosphate esters of sugars, borate esters of sugars, sulfate esters of sugars, aryl boronic acids, esters of aryl boronic acids, aryl dioxaborolanes, triaryl boroxines, trialkoxyboroxines, alkyl trialkoxy silanes, alkyl triacyloxy silanes, alkyl triaryloxy silanes, hydroxy carboxylic acids, non-polymeric polycarboxylic acids, and mixtures thereof, and wherein the alkyl groups in the above molecules are $C_1$ to about $C_6$ groups, and the aryl groups in the above molecules are about $C_6$ to about $C_{10}$ groups, and wherein the substituted alkyls are selected from the group consisting of hydroxyalkyls, carboxyalkyls, and mixtures thereof.

10. The cementitious formulation of claim 9, wherein the A moiety is selected from the group consisting of 2-carboxyethyl phosphonic acid, sulfosuccinic acid, citric acid, 2-phosphono-1,2,4-butane tricarboxylic acid, glucuronic acid, ethylenediaminetetraacetic acid, gluconic acid, cyclohexane hexacarboxylic acid, mellitic acid, saccharic acid, mucic acid, diethylenetriamine pentaacetic acid, glucoheptonic acid, glucoheptonic lactone, lactobionic acid, 3,3',4,4'-benzophenone tetracarboxylic acid, 2-(4'carboxyphenyl)- 1,3,2-dioxaborolane, triphenyl boroxine, 4-carboxyphenyl boronic acid, 4-formylphenyl boronic acid, 2-(4'-formylphenyl)-1,3,2-dioxaborolane, amino propyl trimethoxysilane, aminopropyltriethoxysilane, 3-glycidoxypropyltrimethoxy silane, 3-glycidoxypropyltriethoxysilane, 3-(triethoxysilyl)propyl isocyanate, 3-(trimethoxysilyl)propyl isocyanate, glucooctanoic-γ-lactone, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl) iminodiacetic acid, 3-[[tris(hydroxymethyl)methyl] amino]-1-propanesulfonic acid, 2-[[tris(hydroxymethyl)methyl] amino]-1-ethanesulfonic acid, 3-[bis(2-hydroxyethyl) amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, glucosamine, galactosamine, mannosamine, tris (hydroxymethyl)aminomethane, γ-carboxyglutamic acid, glucamine, glucosaminic acid, β-carboxyaspartic acid, α-hydroxymethylaspartic acid, tricine, 1,2,3,4-cyclopentanetetracarboxylic acid, 6-phosphogluconic acid, sorbitol, mannose, mannitol, mannonic acid, mannuronic acid, galactose, galactitol, galactaric acid, galacturonic acid, fructose, sucrose, salts of any of the preceding moieties, and mixtures thereof.

11. The cementitious formulation of claim 1, wherein the salt of moiety A is selected from the group consisting of lithium, sodium, potassium, calcium, magnesium, aluminum, iron, ammonia, amines, and mixtures thereof.

12. The cementitious formulation of claim 9, wherein the salt of moiety A is selected from the group consisting of lithium, sodium, potassium, calcium, magnesium, aluminum, iron, ammonia, amines, and mixtures thereof.

13. The cementitious formulation of claim 1, wherein the B moiety is selected from the group consisting of $C_1$ to about $C_6$ linear saturated hydrocarbons, $C_1$ to about $C_6$ linear unsaturated hydrocarbons, $C_1$ to about $C_6$ branched saturated hydrocarbons, $C_1$ to about $C_6$ branched unsaturated hydrocarbons, about $C_6$ to about $C_{10}$ arylenes, nitrogen containing compounds, and mixtures thereof.

14. The cementitious formulation of claim 13, wherein the B moiety is selected from the group consisting of methylene, ethylene, n-propylene, n-butylene, n-pentylene, n-hexylene, isobutylene, neopentylene, propenylene, isobutenylene, diethylene triamine, triethylene tetramine, tetraethylene pentamine, or pentaethylene hexamine, phenylene, substituted arylenes such as

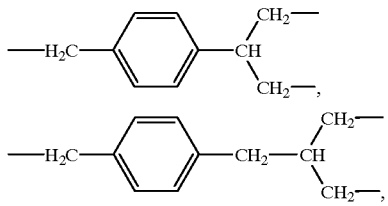

and mixtures thereof.

15. The cementitious formulation of claim 1, wherein the C moiety has a number average molecular weight from about 500 to about 100,000.

16. The cementitious formulation of claim 15, wherein the C moiety has a number average molecular weight from about 1,000 to about 50,000.

17. The cementitious formulation of claim 16, wherein the C moiety has a number average molecular weight from about 1,000 to about 30,000.

18. The cementitious formulation of claim 1, wherein the dispersant has a number average molecular weight from about 650 to about 100,000.

19. The cementitious formulation of claim 18, wherein the dispersant has a number average molecular weight from about 1,150 to about 50,000.

20. The cementitious formulation of claim 19, wherein the dispersant has a number average molecular weight from about 1,150 to about 30,000.

21. The cementitious formulation of claim 1 further comprising an additive selected from the group consisting of soil, calcined clay, and mixtures thereof.

22. The cementitious formulation of claim 21, wherein the additive replaces up to about 25% of the cement.

23. A cementitious formulation comprising a cement and a blocked oligomeric dispersant comprising a reaction product of component A, optionally component B, and component C;

wherein each component A is independently a blocked, nonpolymeric, functional moiety that adsorbs onto a cementitious particle after deblocking, and contains at least one residue derived from a first component selected from the group consisting of alkyl trialkoxy silanes, alkyl triacyloxy silanes, alkyl triaryloxy silanes, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof;

wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof; and wherein the blocked oligomeric dispersant is present in the cementitious formulation in combination with a second dispersant selected from the group consisting of an oligomeric dispersant, a cementitious dispersant, and mixtures thereof;

wherein the oligomeric dispersant comprises a reaction product of component A1, optionally component B1, and component C1;

wherein each component A1 is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B1 is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and wherein component C1 is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof.

24. The cementitious formulation of claim 23, wherein the cementitious dispersant is selected from the group consisting of beta naphthalene sulfonates, lignosulfonates, polyacrylic acids, polymethacrylic acids, polycarboxylates, polyaspartates, and mixtures thereof.

25. The cementitious formulation of claim 23, wherein the blocked oligomeric dispersant is present in an amount from about 0.005% to about 2% based on the weight of the cement.

26. The cementitious formulation of claim 23, wherein the ratio of blocked oligomeric dispersant to second dispersant is from about 1:10 to about 5:1.

27. A method of dispersing a cementitious formulation comprising a cement in water, comprising providing in said cementitious formulation the cement dispersant of claim 1 and mixing said cementitious formulation.

28. The method of claim 27, wherein the cement is selected from the group consisting of portland cement, masonry cement, alumina cement, refractory cement, magnesia cement, calcium sulfoaluminate cement, and mixtures thereof.

29. The method of claim 27 including providing aggregate in the cementitious formulation.

30. The method of claim 27 including providing a cement admixture selected from the group consisting of set accelerators, set retarders, air entraining agents, air detraining agents, foaming agents, defoaming agents, corrosion inhibitors, shrinkage reducing agents, pozzolans, cementitious dispersants, pigments, and mixtures thereof in the cementitious formulation.

31. The method of claim 27 including providing water in the cementitious formulation contains in an amount from about 20% to about 100% based on the dry weight of the cement.

32. The method of claim 27 including providing the cement dispersant in an amount from about 0.005 to about 2% based on the dry weight of the cement.

33. The method of claim 27 including providing the cement dispersant in an amount from about 0.01 to about 1% based on the dry weight of the cement.

34. The method of claim 27, wherein the dispersant has a structure selected from the group consisting of

| (i) $A_x$-C; | (ii) $A_x$-C-$A_x$; | (iii) C-$A_x$-C; |
| (iv) $(A_x)_y$-B-$(C)_z$; | (v) $(C)_z$-B-$A_x$-B-$(C)_z$; | (vi) $(A_x)_y$-B-C-B-$(A_x)_y$; | and mixtures thereof, wherein x is an integer from 1 to 3 and represents the number of A moieties in a linear chain, y is an integer from 1 to 3 and represents the number of independent chains of A moieties, and z is an integer from 1 to 3 and represents the number of independent C moieties.

35. The method of claim 27, wherein the A moiety is selected from the group consisting of sugars, sugar acids, lactones of sugar acids, sugar alcohols, tris(hydroxymethyl) aminomethane, phosphate esters of sugars, borate esters of sugars, sulfate esters of sugars, aryl boronic acids, esters of aryl boronic acids, aryl dioxaborolanes, triaryl boroxines, trialkoxyboroxines, alkyl trialkoxy silanes, alkyl triacyloxy silanes, alkyl triaryloxy silanes, hydroxy carboxylic acids, non-polymeric polycarboxylic acids, and mixtures thereof, and wherein the alkyl groups in the above molecules are $C_1$ to about $C_6$ groups, and the aryl groups in the above molecules are about $C_6$ to about $C_{10}$ groups, and wherein the substituted alkyls are selected from the group consisting of hydroxyalkyls, carboxyalkyls, and mixtures thereof.

36. The method of claim 35, wherein the A moiety is selected from the group consisting of 2-carboxyethyl phosphonic acid, sulfosuccinic acid, citric acid, 2-phosphono-1,2,4-butane tricarboxylic acid, glucuronic acid, ethylenediaminetetraacetic acid, gluconic acid, cyclohexane hexacarboxylic acid, mellitic acid, saccharic acid, mucic acid, diethylenetriamine pentaacetic acid, glucoheptonic acid, glucoheptonic lactone, lactobionic acid, 3,3',4,4'-benzophenone tetracarboxylic acid, 2-(4'carboxyphenyl)-1,3,2-dioxaborolane, triphenyl boroxine, 4-carboxyphenyl boronic acid, 4-formylphenyl boronic acid, 2-(4'-formylphenyl)-1,3,2-dioxaborolane, amino propyl trimethoxysilane, aminopropyltriethoxysilane, 3-glycidoxypropyltrimethoxy silane, 3-glycidoxypropyltriethoxysilane, 3-(triethoxysilyl)propyl isocyanate, 3-(trimethoxysilyl)propyl isocyanate, glucooctanoic-γ-lactone, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl) iminodiacetic acid, 3-[[tris(hydroxymethyl)methyl] amino]-1-propanesulfonic acid, 2-[[tris(hydroxymethyl)methyl] amino]-1-ethanesulfonic acid, 3-[bis(2-hydroxyethyl) amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, glucosamine, galactosamine, mannosamine, tris (hydroxymethyl)aminomethane, γ-carboxyglutamic acid, glucamine, glucosaminic acid, β-carboxyaspartic acid, α-hydroxymethylaspartic acid, tricine, 1,2,3,4-cyclopentanetetracarboxylic acid, 6-phosphogluconic acid, sorbitol, mannose, mannitol, mannonic acid, mannuronic acid, galactose, galactitol, galactaric acid, galacturonic acid, fructose, sucrose, salts of any of the preceding moieties, and mixtures thereof.

37. The method of claim 27, wherein the salt of moiety A is selected from the group consisting of lithium, sodium, potassium, calcium, magnesium, aluminum, iron, ammonia, amines, and mixtures thereof.

38. The method of claim 35, wherein the salt of moiety A is selected from the group consisting of lithium, sodium, potassium, calcium, magnesium, aluminum, iron, ammonia, amines, and mixtures thereof.

39. The method of claim 27, wherein the B moiety is selected from the group consisting of $C_1$ to about $C_6$ linear saturated hydrocarbons, $C_1$ to about $C_6$ linear unsaturated hydrocarbons, $C_1$ to about $C_6$ branched saturated hydrocarbons, $C_1$ to about $C_6$ branched unsaturated hydrocarbons, about $C_6$ to about $C_{10}$ arylenes, nitrogen containing compounds, and mixtures thereof.

40. The method of claim 39, wherein the B moiety is selected from the group consisting of methylene, ethylene, n-propylene, n-butylene, n-pentylene, n-hexylene, isobutylene, neopentylene, propenylene, isobutenylene, diethylene triamine, triethylene tetramine, tetraethylene pentamine, or pentaethylene hexamine, phenylene, substituted arylenes such as

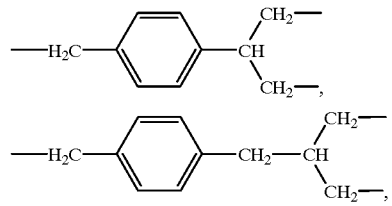

and mixtures thereof.

41. The method of claim 27, wherein the C moiety has a number average molecular weight from about 500 to about 100,000.

42. The method of claim 41, wherein the C moiety has a number average molecular weight from about 1,000 to about 50,000.

43. The method of claim 42, wherein the C moiety has a number average molecular weight from about 1,000 to about 30,000.

44. The method of claim 27, wherein the dispersant has a number average molecular weight from about 650 to about 100,000.

45. The method of claim 44, wherein the dispersant has a number average molecular weight from about 1,150 to about 50,000.

46. The method of claim 45, wherein the dispersant has a number average molecular weight from about 1,150 to about 30,000.

47. The method of claim 27 further comprising mixing an additive selected from the group consisting of soil, calcined clay, and mixtures thereof into the cementitious formulation.

48. The method of claim 47, wherein the additive replaces up to about 25% of the cement.

49. A method of dispersing a cementitious formulation comprising a cement in water, comprising providing in said cementitious formulation a blocked oligomeric dispersant comprising a reaction product of component A, optionally component B, and component C;

wherein each component A is independently a blocked, nonpolymeric, functional moiety that adsorbs onto a cementitious particle, and contains at least one residue derived from a first component selected from the group consisting of alkyl trialkoxy silanes, alkyl triacyloxy silanes, alkyl triaryloxy silanes, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof;

wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof; and wherein the blocked oligomeric dispersant is present in the cementitious formulation in combination with a second dispersant selected from the group consisting of an oligomeric dispersant, a cementitious dispersant, and mixtures thereof;

wherein the oligomeric dispersant comprises a reaction product of component A1, optionally component B1, and component C1;

wherein each component A1 is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B1 is an optional moiety, where if present, each component B1 is independently a nonpolymeric moiety that is disposed between the component A1 moiety and the component C1 moiety, and is derived from a second component selected from the group consisting of linear saturated hydrocarbons, linear unsaturated hydrocarbons, saturated branched hydrocarbons, unsaturated branched hydrocarbons, aryl, phosphoester, nitrogen containing compounds, and mixtures thereof; and wherein component C1 is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol) poly(vinyl pyrrolidones), poly(methyl vinyl ethers), poly(ethylene imines), poly(acrylamides), polyoxazoles, and mixtures thereof;

and mixing said cementitious formulation.

50. The method of claim 49, wherein the cementitious dispersant is selected from the group consisting of beta naphthalene sulfonates, lignosulfonates, polyacrylic acids, polymethacrylic acids, polycarboxylates, polyaspartates, and mixtures thereof.

51. The method of claim 49, wherein the blocked oligomeric dispersant is present in an amount from about 0.005% to about 2% based on the weight of the cement.

52. The method of claim 49, wherein the ratio of blocked oligomeric dispersant to second dispersant is from about 1:10 to about 5:1.

* * * * *